(No Model.) 2 Sheets—Sheet 2.

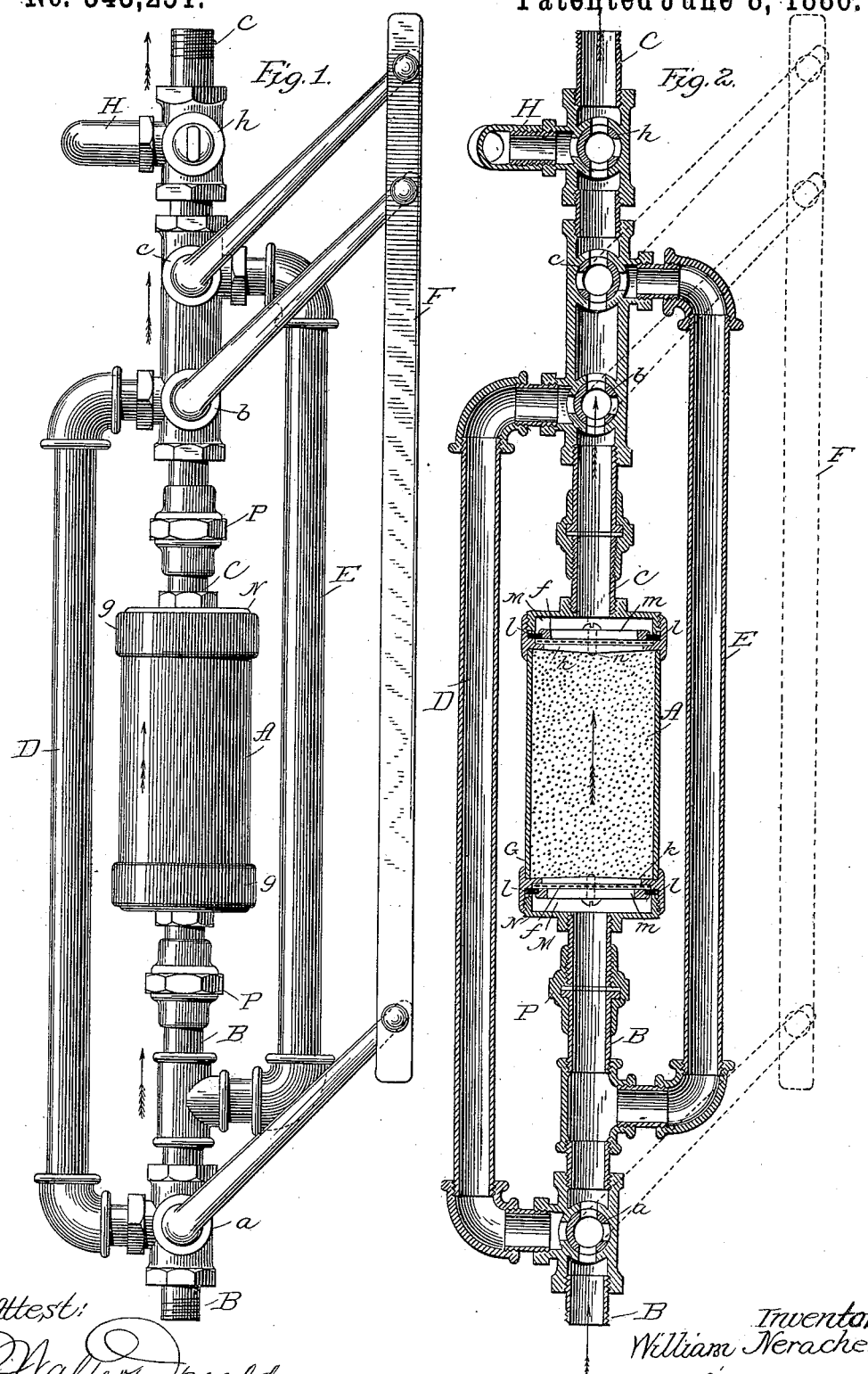

W. NERACHER.
FILTERING APPARATUS.

No. 343,251. Patented June 8, 1886.

Attest
Walter Donaldson
F. L. Middleton

Inventor
William Neracher
by Joyce & Spear
Attys.

United States Patent Office.

WILLIAM NERACHER, OF CLEVELAND, OHIO.

FILTERING APPARATUS.

SPECIFICATION forming part of Letters Patent No. 343,251, dated June 8, 1886.

Application filed February 14, 1885. Serial No. 155,962. (No model.)

*To all whom it may concern:*

Be it known that I, WILLIAM NERACHER, of Cleveland, in the county of Cuyahoga and State of Ohio, have invented a new and useful Improvement in Filtering Apparatus; and I do hereby declare that the following is a full, clear, and exact description of the same.

My invention is an improved filtering apparatus designed to be applied to the water-pipes which convey water to houses and other buildings, where the water is to be used for drinking, culinary, and other purposes where pure water is required. In the application of filters to such pipes a well-known difficulty occurs in the accumulation of sediment or filtering matter within the filter, which requires that either the filter should be removed for cleaning, or that the stream of water passing through the filter should in some way be reversed. Efforts have been heretofore made to pass a reversed stream through the filter for the purpose of cleaning it.

My invention relates to an arrangement of pipes and valves connected with the filter and a main supply-pipe for accomplishing this purpose.

In the arrangement of valves and pipes for reversing the current through the filter it is desirable that the current in either direction should be capable of use as a water-supply after it has served its purpose in cleaning the filter; and my invention is especially adapted to this end, so that when the filter becomes clogged or foul the valves may be shifted and the current reversed, and this reversed current may be allowed to run until it becomes necessary to clean the other end of the filter. This constitutes the main feature of my invention. Other features relate to the details of construction and to the arrangement of pipes and valves in respect to the filter.

Figure 4:
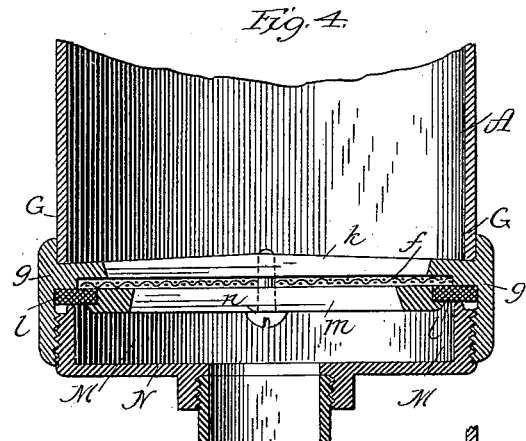
Figure 6:
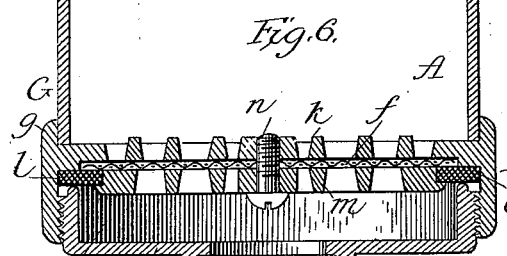
Figure 7:
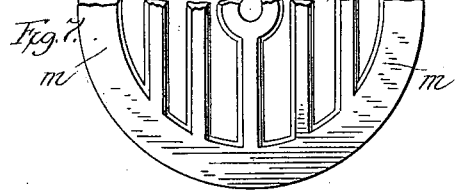
Figure 5:
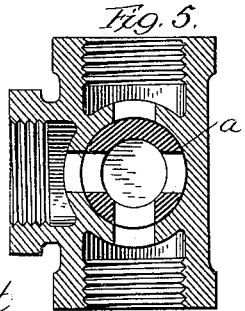
Figure 3:
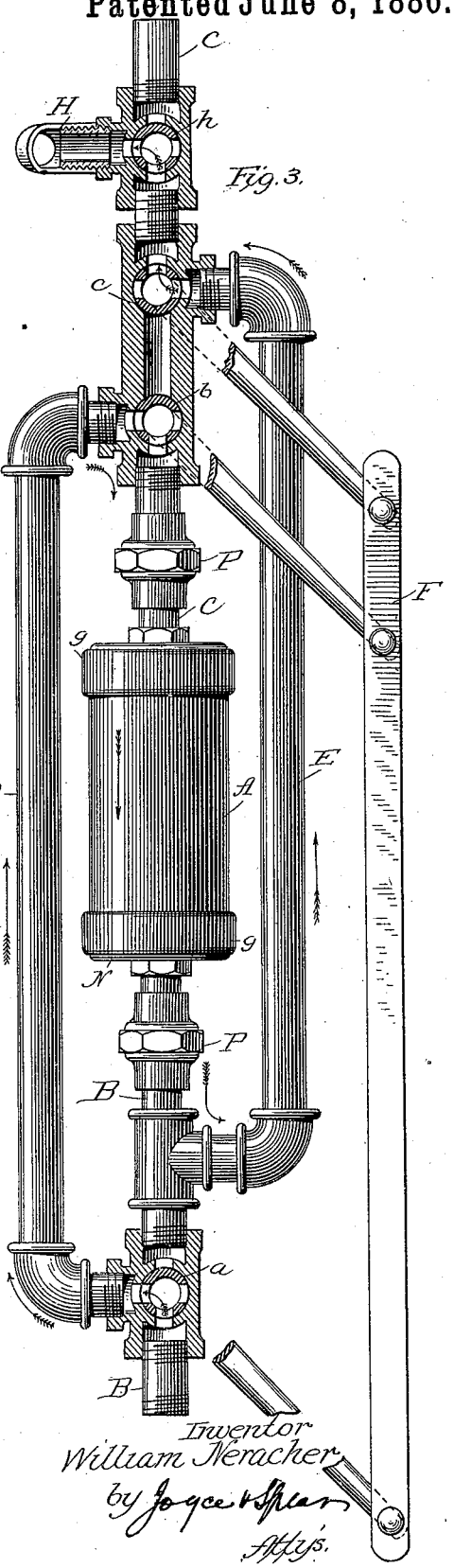

In the accompanying drawings, which illustrate my invention, Figure 1 is a side elevation of the filter and pipes with the valves in position to allow a direct current through the filter. Fig. 2 shows a central section through said filter and pipes with the valves in the same position. Fig. 3 shows the filter pipes and valves, partly in elevation and partly in section, with the valves shifted to give the reversed current through the filter. Fig. 4 is an enlarged view showing details of the filter. Fig. 5 shows an enlarged view of the three-way cock. Figs. 6 and 7 are detail views of the grate of the filter-chamber.

In these drawings, A represents a filter, the particular construction of which is hereinafter explained, it being necessary to state in this connection that the filter should be capable of operating equally in both directions of the currents. A pipe, B, connected at one end of this filter, supplies it with water from the main, and a pipe, C, conducts the water from the other end to the proper point in the house or other building. In the pipe B is a three-way cock, *a*, and in the pipe C are two three-way cocks *b c*. A pipe, D, leads from the three-way cock *a* to the three-way cock *b*, and a pipe, E, leads from the three-way cock *c* to a T-joint in the pipe B, between the three-way cock *a* and the filter.

The pipes B and C are the main water-supply pipes. It will be observed that the end of the pipe E not provided with a cock has its junction with the water-supply pipe at a point between the junction of the pipe D and the filter, and the other end of pipe E joins the other part of the main water-supply pipe C outside of the junction of the pipe D with the pipe C. As the pipe D is a side pipe, to form a circuit around the filter, it has a three-way cock at both ends, and these may be opened for the direct passage of the water, (shown by arrows in Figs. 1 and 2,) or turned to close the direct and open the side passage, as in Fig. 3. The pipe E, serving only to take the return-current from the filter when the cock *a* is turned to obstruct the pipe B, requires no cock at the junction between the filter and the cock *a*.

The handles of the three cocks specified are connected by a bar, F, so that they must all move together. When they are turned in the position shown in Figs. 1 and 2, the current of water flows in the direction shown by the arrows—that is to say, directly through the filter and its immediate connecting-pipes—the cocks being so turned that the pipe D is shut off both from the pipes B and C, and the pipe E is shut off from the pipe B, no current being permitted to flow through either. In order to reverse the current, the valves are shifted to the position shown in Fig. 3. In this position the valve *a* drives water in the pipe D, excluding it from direct passage through the filter. The cock $b$ in this position opens a passage from the pipe D into the filter, but obstructs the passage in the pipe C to any point beyond the cock $b$. The cock $c$ in this position opens communication from the pipe E into the pipe C toward the delivery-point of the water to the house. In this position the current of water is reversed through the filter, but is delivered to the house in the same manner as in Figs. 1 and 2. The apparatus may be left in this position until the filter is again foul.

Thus in the use of the apparatus it may be shifted to one position and remain in that position until the filter becomes foul, and then may be shifted to the other position and allowed to remain until a like condition occurs.

In order to get rid of the foul water which flows during the cleaning of the filter, I have provided a pipe, H, and three-way cock $h$, whereby the foul water may be turned aside and discharged into a sewer. The cock being turned in position shown in Fig. 2, water is allowed to run to the faucet. In the position shown in Fig. 3 it is directed into the pipe H.

The apparatus may be located in any convenient position, and the bar F may have any convenient attachment whereby it may be moved, and it may be easily shifted from one position to another.

The interior of the filter A, I propose to provide with granulated animal charcoal, or any other suitable material may be used, and I retain this in place by screens, such as are ordinarily used; but in order to obtain a greater surface in the screen, I have applied it to the head of the filter instead of applying it to the pipe, and in order to support a large portion of screens I have provided grates between which it is clamped. This construction is more clearly shown in Fig. 4, in which the screen $f$ is made in diameter nearly equal to the filter-body G, and is applied to said body. The head of the filter is formed of a cylindrical flange, $g$, cast with a grate, $k$. This is provided with a recess in which the screen $f$ is placed, and over this is laid an annular rubber packing, $l$, resting upon the ledge of the flange $g$. Over the screen and this packing is placed an outer grate, $m$, this being clamped to the screen by a screw, $n$, passing through into the inner grate. The construction of the filter is the same at both ends.

A chamber, M, is formed outside of the grate by means of a flanged head, N, which is screwed into the flange $g$, and to this head the pipe is connected. Through this chamber the water is discharged equally to all parts of the screen, and thus a large surface of screen is provided with corresponding capacity to resist clogging outside of the screen.

Upon each side of the filter-chamber I provide union-joints P P, whereby the chamber may be easily and quickly removed for the renewal or repair of any of the parts.

I claim as my invention—

1. A filter placed in a water-supply pipe, adapted to a current in either direction, in combination with a side pipe, D, connected to the water-supply pipe at both ends of the filter, and three-way cocks at the junction at both ends, a side pipe, E, connected to the water-supply pipe at one end of the filter, between the junction of the pipe D and the filter, and at the other to the water-supply pipe at a point outside of the junction of said pipe D and the water-supply pipe, and a three-way cock at the latter junction, and devices for operating the cocks, all substantially as described.

2. A filter placed in a water-supply, adapted to a current in either direction, in combination with a side pipe, D, connected to the water-supply pipe at both ends of the filter, and three-way cocks at the junction at both ends, a side pipe, E, connected to the water-supply pipe at one end of the filter, between the junction of the pipe D and the filter, and at the other to the water-supply pipe at a point outside of the junction of said pipe D and the water-supply pipe, a three-way cock at the latter junction, and devices for operating the cocks, a sewer-connection, H, provided with a three-way cock, $h$, all substantially as described.

In testimony whereof I have signed my name to this specification in the presence of two subscribing witnesses.

WILLIAM NERACHER.

Witnesses:
J. B. THOMPSON,
F. L. MIDDLETON.